United States Patent
Little et al.

(10) Patent No.: US 9,476,355 B2
(45) Date of Patent: Oct. 25, 2016

(54) MID-SECTION OF A CAN-ANNULAR GAS TURBINE ENGINE WITH A RADIAL AIR FLOW DISCHARGED FROM THE COMPRESSOR SECTION

(75) Inventors: David A. Little, Chuluota, FL (US); Gerard McQuiggan, Orlando, FL (US); David L. Wasdell, Winter Park, FL (US)

(73) Assignee: SIEMENS ENERGY, INC., Orlando, FL (US)

( * ) Notice: Subject to any disclaimer, the term of this patent is extended or adjusted under 35 U.S.C. 154(b) by 1065 days.

(21) Appl. No.: 13/408,147

(22) Filed: Feb. 29, 2012

(65) Prior Publication Data
US 2013/0224009 A1 Aug. 29, 2013

(51) Int. Cl.
*F02C 3/08* (2006.01)
*F23R 3/04* (2006.01)
*F02C 3/14* (2006.01)

(52) U.S. Cl.
CPC .................... *F02C 3/14* (2013.01)

(58) Field of Classification Search
CPC .......... F23R 3/04; F02C 3/08; F04D 29/542; F04D 29/44–29/444; F04D 29/441; F04D 29/541; F04D 29/681; F04D 29/4206; F04D 29/54; F04D 29/287; F04D 29/30
USPC ............ 60/751, 39.37, 805; 415/207, 224.5; 416/23, 147, 155
See application file for complete search history.

(56) References Cited

U.S. PATENT DOCUMENTS

| | | | | | |
|---|---|---|---|---|---|
| 2,396,068 | A | * | 3/1946 | Youngash | F02C 3/32 181/215 |
| 2,445,114 | A | * | 7/1948 | Halford | 60/751 |
| 2,473,356 | A | * | 6/1949 | Birmann | F02C 6/003 415/199.2 |
| 2,475,911 | A | * | 7/1949 | Nathan | F23R 3/04 60/39.37 |
| 2,567,079 | A | * | 9/1951 | Owner | F23R 3/425 415/183 |
| 2,593,523 | A | * | 4/1952 | Bauger | F02C 5/10 60/805 |
| 2,627,721 | A | * | 2/1953 | Rosenlund | 60/751 |
| 2,663,141 | A | * | 12/1953 | Hage | F02C 3/103 12/142 F |
| 3,010,281 | A | * | 11/1961 | Cervenka | F02C 3/085 60/39.37 |
| 3,088,279 | A | * | 5/1963 | Diedrich | F23R 3/42 60/39.826 |
| 3,420,435 | A | * | 1/1969 | Jarosz et al. | 415/207 |
| 3,546,880 | A | * | 12/1970 | Schwaar | 60/792 |
| 3,738,105 | A | * | 6/1973 | Buchelt | 60/39.37 |
| 3,941,501 | A | * | 3/1976 | Shank | 415/147 |
| 4,081,957 | A | * | 4/1978 | Cox, Jr. | 60/751 |
| 4,455,121 | A | * | 6/1984 | Jen | 415/143 |
| 4,849,895 | A | * | 7/1989 | Kervistin | F01D 11/24 60/805 |
| 5,317,865 | A | * | 6/1994 | Inoue et al. | 60/804 |
| 6,968,696 | B2 | | 11/2005 | Little | |
| 7,086,233 | B2 | | 8/2006 | Chehab et al. | |
| 7,096,673 | B2 | | 8/2006 | Little et al. | |
| 7,107,773 | B2 | | 9/2006 | Little | |
| 7,721,547 | B2 | | 5/2010 | Bancalari et al. | |
| 2009/0047127 | A1 | * | 2/2009 | Commaret et al. | 415/211.2 |
| 2010/0077768 | A1 | * | 4/2010 | Leblanc | 60/751 |
| 2010/0129224 | A1 | * | 5/2010 | Shibata et al. | 416/182 |
| 2010/0232953 | A1 | * | 9/2010 | Anderson et al. | 415/199.2 |
| 2011/0271654 | A1 | * | 11/2011 | Siden | 60/39.37 |
| 2011/0314828 | A1 | * | 12/2011 | Bil et al. | 60/751 |
| 2011/0318188 | A1 | * | 12/2011 | Billotey et al. | 416/223 A |

* cited by examiner

Primary Examiner — Ted Kim

(57) ABSTRACT

A midframe portion (213) of a gas turbine engine (210) is presented, and includes a compressor section (212) configured to discharge an air flow (211) directed in a radial direction from an outlet of the compressor section (212). Additionally, the midframe portion (213) includes a manifold (214) to directly couple the air flow (211) from the compressor section (212) outlet to an inlet of a respective combustor head (218) of the midframe portion (213).

15 Claims, 5 Drawing Sheets ers to support a shaft cover 32 of the rotor assembly 17

MID-SECTION OF A CAN-ANNULAR GAS TURBINE ENGINE WITH A RADIAL AIR FLOW DISCHARGED FROM THE COMPRESSOR SECTION

STATEMENT REGARDING FEDERALLY SPONSORED DEVELOPMENT

Development for this invention was supported in part by Contract No. DE-FC26-05NT42644, awarded by the United States Department of Energy. Accordingly, the United States Government may have certain rights in this invention.

FIELD OF THE INVENTION

The invention relates to can-annular gas turbine engines, and more specifically, to a midframe portion of a can-annular gas turbine engine.

BACKGROUND OF THE INVENTION

A conventional midframe design for a can-annular gas turbine engine is discussed in U.S. Pat. No. 7,721,547 ("'547 patent"), assigned to the assignee of the present invention, which is incorporated by reference herein. FIG. 1 of the '547 patent is reproduced as FIG. 1 herein, and illustrates a cross-section through a midframe portion 13 of a conventional can-annular gas turbine engine 10. The major components of the gas turbine engine 10 are a compressor section 12, a combustion section 16 and a turbine section 48. A rotor assembly 17 is centrally located and extends through the three sections. In operation, the compressor section 12 receives air through an intake (not shown) and compresses it. The compressed air flow 11 passes from the compressor section 12 to an axial diffuser 14, after which the air flow 11 enters a chamber 15 within a casing 19, where the total air flow 11 is separated and enters one of multiple combustor heads 18 of the can-annular combustion section 16 that encircle the rotor assembly 17 in an annular configuration.

As illustrated in FIG. 1, the compressor section 12 includes cylinders 27, 29 that enclose alternating rows of stationary vanes 23 and rotating blades 25. The stationary vanes 23 can be affixed to the cylinder 27 while the rotating blades 25 can be mounted to the rotor assembly 17 for rotation with the rotor assembly 17. The stationary vanes 23 include a last stationary vane 26 and an outlet guide vane 28 positioned adjacent to an outlet of the compressor section 12. Additionally, the rotating blades 25 include a last stage blade 24 positioned upstream from the last stationary vane 26 and the outlet guide vane 28. The last stationary vane 26 and outlet guide vane 28 are used to remove an absolute tangential swirl angle (measured in an absolute reference frame with respect to the longitudinal direction) of the air flow 11 coming off the last stage blade 24.

As further illustrated in FIG. 1, load-bearing struts 30 are provided to support a shaft cover 32 of the rotor assembly 17 at the casing 19 of the combustion section 16. As appreciated by one of skill in the art, one strut 30 may be provided per each one to four combustor heads 18. As illustrated in FIG. 1, the axial diffuser 14 includes an inner cone 36 and an outer cone 34 and the cross-sectional area between the inner and outer cones 36, 34 increases in the longitudinal direction 68, such that the air flow 11 expands and decelerates through the diffuser 14, thereby converting velocity head into pressure head. As illustrated in FIG. 1, the strut 30 is attached between a shaft cover 32 to the outer cone 34 of the axial diffuser 14, and thus the casing 19 of the combustion section 16 supports the strut 30 at the shaft cover 32.

As further illustrated in FIG. 1, a rotor-cooling extraction pipe 38 is provided, which extracts compressed air from the chamber 15 and passes the compressed air into a cooler 42. The cooled air passes from the cooler 42 and through rotor-cooling injection pipes 40 that are positioned within the chamber 15 and direct the cooled air below the shaft cover 32, to cool the rotating components of the engine.

Another portion of the engine needing cooling is a turn in the transition 20 at an inlet to the turbine section 48, which typically experiences an especially high heat flux during an operation of the gas turbine engine 10. In order to cool a rear end 54 of the transition 20 during operation of the gas turbine 10, a portion 58 of the air flow 11 entering the chamber 15 makes contact with the rear end 54 of the transition 20 proximate the highest heat flux region in order to cool the rear end 54 of the transition 20 using thermal convection.

FIG. 8 of the '547 patent is reproduced herein as FIG. 2, and illustrates a "trans-vane" transition 20' which improves upon the transition 20 of FIG. 1. FIG. 2 illustrates a top down radial view of the midframe portion 13' of the gas turbine engine 10' including the combustion section 16' and a first stage turbine blade array 49' of the turbine section 48' located downstream from the combustion section 16', with the trans-vane transition 20' located therebetween. The midframe portion 13' of FIG. 2 includes a compressor section (not shown) similar to the compressor section 12 of FIG. 1. A first stage housing encloses the first stage turbine blade array 49' and includes a blade ring 51'. An upstream side 53' of the blade ring 51' is preferably adapted to couple to a transition outlet 55'. The trans-vane transition 20' includes a transition duct body 60' with an inlet 62' to receive a gas flow exhausted from the combustor section 16' and the outlet 55' to discharge a gas flow toward the first stage blade array 49' with an internal passage 66' therebetween. The outlet 55' is offset from the inlet 62' in the three coordinate directions— in the radial direction (in/out of the figure), the longitudinal direction 68 and the tangential direction 70'. The gas flow discharged from the outlet 55' is angled in the tangential direction 70' within an absolute reference frame, relative to the longitudinal direction 68 as depicted by the arrow 72', as required by the first stage turbine blade array 49'. A brief discussion will be provided of the absolute and relative reference frames of the midframe portion 13', as well as how the velocity vector of an air flow exiting the compressor and entering the turbine 48' of the gas turbine engine 10' is represented in each of those reference frames. FIG. 3 illustrates a top down radial view of the last stage blade 24 of the compressor section 12 of the gas turbine engine 10' and the first stage blade 49' of the turbine 48' of the midframe portion 13', separated along a longitudinal axis 75 of the conventional gas turbine engine 10' of FIG. 2. An outgoing air flow off the last stage blade 24 is oriented in the (relative) reference frame of the last stage blade 24 along a relative outgoing velocity vector 76. During an operation of the compressor section 12, the last stage blade 24 rotates around the longitudinal axis 75 with a blade velocity vector 78 that is oriented perpendicular to the longitudinal axis 75. In order to determine the velocity vector of the outgoing air flow off the last stage blade 24 in an absolute reference frame, the blade velocity vector 78 is added to the relative outgoing velocity vector 76, resulting in an absolute outgoing velocity vector 80 that is angled in the tangential direction 70 by an angle 82, relative to the longitudinal direction 68. In an exemplary embodiment, the angle 82 is approximately 45 degrees. Accordingly, the absolute outgoing velocity vector 80 of the outgoing air flow off the last stage blade 24 is oriented approximately 45 degrees in the tangential direction 70, relative to the longitudinal direction 68. The last stage vanes 26, 28 of the conventional midframe portion 13' are configured to reduce the angle 82 of the absolute outgoing velocity vector 80 from 45 degrees to approximately 0 degrees, to align the air flow along the longitudinal axis 75. However, as discussed below, the embodiments of the present invention do not utilize the last stage vanes, and thus utilize the initial angle 82 of the absolute outgoing velocity vector 80 off the last stage blade 24. FIG. 3 also illustrates an incoming air flow to the first stage blade 49' of the turbine 48' illustrated in FIG. 2. In order to maximize the effectiveness of the turbine 48', the incoming air flow is oriented in the (relative) reference frame of the first stage blade 49' along a relative incoming velocity vector 84. During an operation of the turbine 48', the first stage blade 49' rotates around the longitudinal axis 75 with a blade velocity 86 that is oriented perpendicular to the longitudinal axis 75. In order to determine the velocity vector of the incoming air flow in the absolute reference frame, the blade velocity vector 86 is added to the relative incoming velocity vector 84, resulting in an absolute incoming velocity vector 88 that is angled in the tangential direction 70 by an angle 90, relative to the longitudinal direction 68. In an exemplary embodiment, the angle 90 is approximately 70 degrees. Accordingly, the absolute incoming velocity vector 88 of the incoming air flow onto the first stage blade 49' of the turbine 48' is oriented approximately 70 degrees in the tangential direction 70, relative to the longitudinal direction 68. In contrast with the transition 20' of FIG. 2, the transition 20 illustrated in FIG. 1 discharges a gas flow to the turbine section 48 with an offset in only the radial direction and the longitudinal direction 68, and thus the gas flow is not angled in the tangential direction relative to the longitudinal direction 68. Since the first stage turbine blade array 49 of the turbine section 48 requires an incoming gas flow that is angled in the tangential direction relative to the longitudinal direction 68, the turbine section 48 of FIG. 1 includes a first stage vane 74, to introduce an offset in the tangential direction for the gas flow discharged from the transition 20. However, by implementing the trans-vane design in the transition 20', the gas flow is discharged from the outlet 55' at the necessary angle 90 in the tangential direction 70 relative to the longitudinal direction 68 to accommodate the first stage turbine blade array 49', and thus the first stage vanes 74 are not needed. In the '547 patent, the inventors made various improvements to the midframe portion of the gas turbine engine, downstream of the combustion section, to enhance the operating efficiency of the gas turbine engine. In the present invention, the present inventors make various improvements to the midframe portion of the gas turbine engine, upstream of the combustion section, to also enhance the cost efficiency of the gas turbine engine.

SUMMARY OF THE INVENTION

The present inventors have recognized that significant improvements in the cost efficiency of a can annular gas turbine engine may be obtained by innovation in the design of the mid-section of the engine. The inventors have recognized that the movement of air from the compressor section to the combustor section in a can-annular gas turbine engine is a generally unstructured, chaotic process. Compressed air produced by the compressor section is directed into the annular chamber 15 and is allowed to find its path of least resistance around various structural obstacles and into one of the respective combustor heads 18. As a result, the flow experiences turbulence and fluid friction induced pressure losses. The present inventors have recognized that an improved engine mid-section design can minimize such losses, thereby providing improved overall engine performance. In addition, the present inventors have recognized that an improved engine mid-section design can also minimize losses associated with cooling the mid-section during operation, as well as lowering the manufacturing cost of the mid-section.

The air flow 11 experiences aerodynamic loss based on a total angle of rotation while traveling from the compressor section 12 to one of the combustor heads 18. The last stationary vane 26 and outlet guide vane 28 collectively rotate the air flow 11 by an initial absolute tangential swirl angle to remove the initial absolute tangential swirl angle that is imparted by the rotating blades 24, such as 45 degrees, to align the air flow 11 in a downstream longitudinal direction 68 upon entering the axial diffuser 14. In addition to the initial absolute tangential swirl angle rotation, upon exiting the diffuser 14 and entering the chamber 15, the air flow 11 experiences two 180 degree rotations: a first approximate 180 degree rotation to orient the air flow 11 from an initial downstream longitudinal direction 68 to an upstream longitudinal direction to travel longitudinally backward to a respective combustor head 18, and a second approximate 180 degree rotation at the combustor head 18 to direct the air flow 11 into an inlet of the combustor head 18. Accordingly, the air flow 11 undergoes a total rotation of approximately 400 degrees while traveling from the compressor section 12 to one of the combustor heads 18, and most of this rotation is accomplished in the unstructured environment of the chamber 15. The present inventors have recognized that the aerodynamic efficiency of the air flow from the compressor section to the respective combustor head can be enhanced by reducing this total rotation of the air and/or controlling the rotation process more precisely. For example, a radial velocity component may be introduced to the air flow at the diffuser outlet, such that the air flow is either a mixed-flow (which has combined longitudinal and radial velocity components) or a radial flow (which has a substantially radial velocity component) at the diffuser outlet. By introducing the radial velocity component to the air flow at the diffuser outlet, the required total angle of rotation within the chamber 15 will be decreased, and the aerodynamic efficiency of the air flow from the compressor section to the respective combustor head would be enhanced.

As discussed above, the last stage vane and outlet guide vane of a prior art can-annular gas turbine engine 10 are provided to eliminate the initial tangential swirl angle of approximately 45 degrees that is imparted by the rotating compressor blades 24, so that the air flow is directed into the chamber 15 along a downstream longitudinal direction (0 degree tangential swirl angle). The present inventors have recognized that some transition designs, such as the trans-vane design discussed above in FIG. 2, require a final absolute tangential swirl angle (with respect to the longitudinal direction 68) to be output from the transition 20' to the first stage blade 49' of the turbine section 48' which is greater than the initial absolute tangential swirl angle generated by the last stage blade of the compressor section. For example, in an exemplary embodiment, a trans-vane design requires a final absolute tangential swirl angle of 70 degrees to the first stage blade 49' of the turbine section 48', in excess of the initial absolute tangential swirl angle of 45 degrees off the last stage blade 24 of the compressor section. The present inventors have also recognized that the aerodynamic efficiency of the air flow 11 from the compressor section 12 to the combustor heads 18 may be enhanced by directly coupling the air flow from respective sections of the compressor-diffuser outlet to each individual combustor head inlet. In the prior art, the compressed air flow 11 passes from the compressor section 12 to the axial diffuser 14, after which the air flow 11 enters the chamber 15 within the casing 19, where the air flow 11 experiences aerodynamic loss in the process of randomly entering any of the multiple combustor heads 18 within the chamber 15. Upon exiting the diffuser 14 and entering the chamber 15, the air flow 11 also experiences aerodynamic losses as a result of making contact with the load-bearing struts 30, the rotor-cooling injection pipes 40 and a near side 22 of the transition 20, which are each positioned adjacent to the outlet of the diffuser 14. By directly coupling the air flow 11 from the compressor-diffuser outlet to a respective combustor head inlet as described herein, the air flow avoids entering the chamber altogether, thereby allowing for the reduction of the aerodynamic losses associated with randomly entering one of the multiple combustor heads 18.

The conventional design of the midframe portion 13 of the gas turbine engine 10 features several components aligned along the axis of the compressor section, such as the last stage blade 24, the last stage vane 26, the outlet guide vane 28 and the axial diffuser 14, for example. The amount of material used to form these components and/or the longitudinal length of these components along the midframe portion of the gas turbine engine collectively contribute to the cost of manufacturing the gas turbine engine. In accordance with an aspect of the invention, when either a mixed-flow or a radial flow of air is provided from a diffuser outlet, one or more of the prior art axial compressor stages could be replaced with a newly designed last stage blade which initiates a mixed-flow or radial flow to be outputted from the compressor section. Thus, by replacing one or more axial compressor stages with a mixed-flow or radial flow at the compressor outlet, the longitudinal length of components and/or the amount of material used to form the midframe portion of the engine is reduced, which lowers the cost of manufacturing the midframe portion of the turbine engine.

BRIEF DESCRIPTION OF THE DRAWINGS

The invention is explained in the following description in view of the drawings that show.

DETAILED DESCRIPTION OF THE INVENTION

As discussed above, the inventors of the present invention recognized that an improved midframe portion of the gas turbine engine features initiating a radial air flow from the diffuser outlet. By initiating the radial air flow from the diffuser outlet, the air flow passes from the diffuser outlet to the combustor head inlet, while undergoing a reduced total angle of rotation, when compared to the air flow with the conventional midframe portion.

Figure 4:
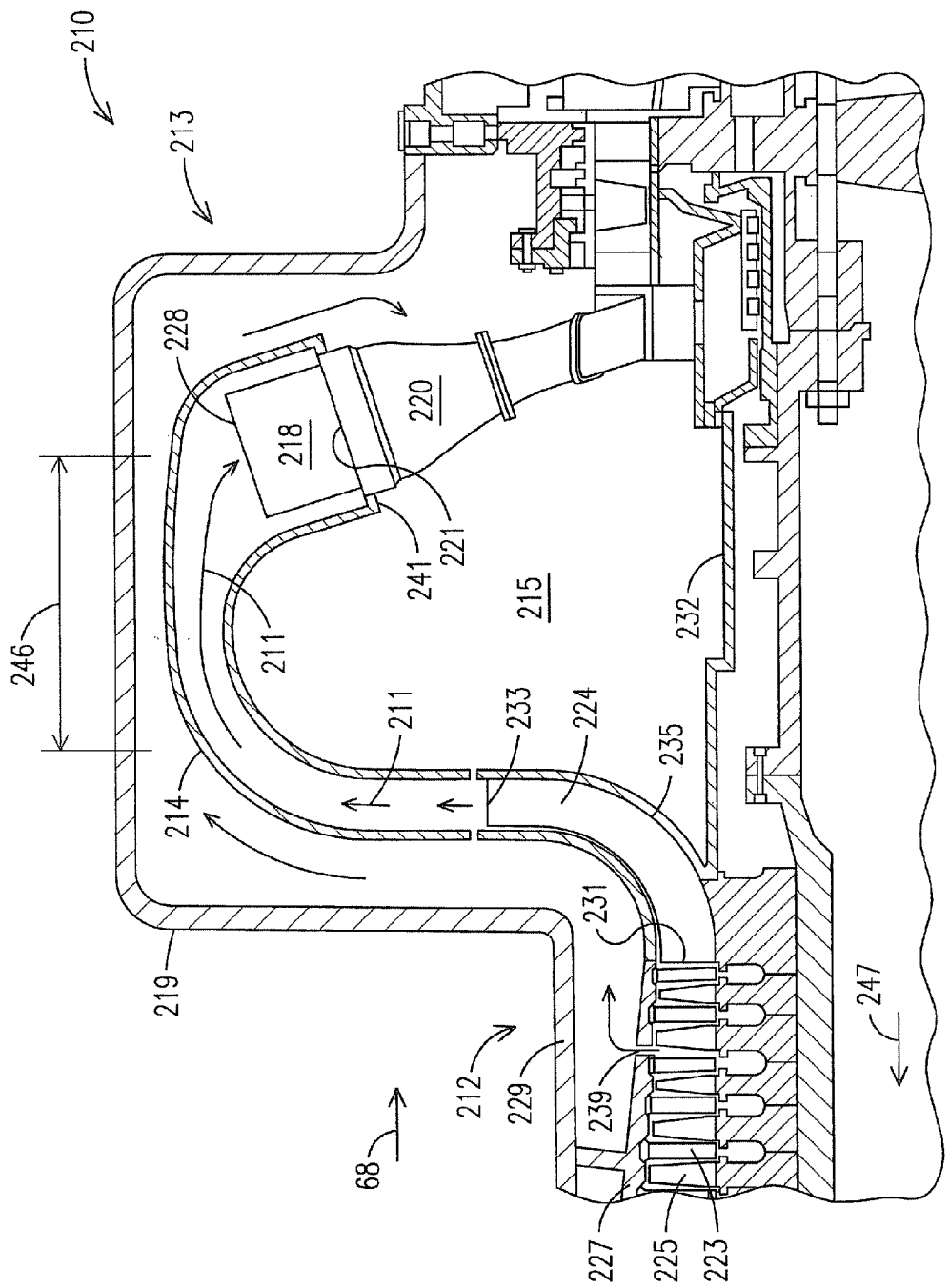
FIG. 4 is a schematic view of a compressor section with a radial outlet to a pipe diffuser within a turbine engine.

FIG. 4 illustrates a midframe portion 213 of a gas turbine engine 210, including a compressor section 212. Unlike the conventional compressor section 12 discussed above, the compressor section 212 includes a last stage blade 224 that directs an air flow 211 in an outward radial direction from the compressor section 212 outlet to a region and subsequently into a respective diffuser 214. The last stage blade 224 includes a leading edge 231 that is substantially aligned with the leading edges of stationary vanes 223 and rotating blades 225 that are positioned upstream of the last stage blade 224, and a trailing edge 233 that is oriented ninety degrees from the leading edge 231 in a radial direction. For a can-annular gas turbine engine, with multiple combustor heads arranged around a rotor assembly in an annular configuration, multiple diffusers are also arranged around the rotor assembly, to guide the air flow from the compressor section to the individual combustor heads. For example, if the can-annular gas turbine engine includes twelve individual combustor heads, then each diffuser has an inlet which extends along one-twelfth of the circumference of the gas turbine engine, and thus receives approximately one-twelfth of the air flow from the compressor section.

Figure 1:
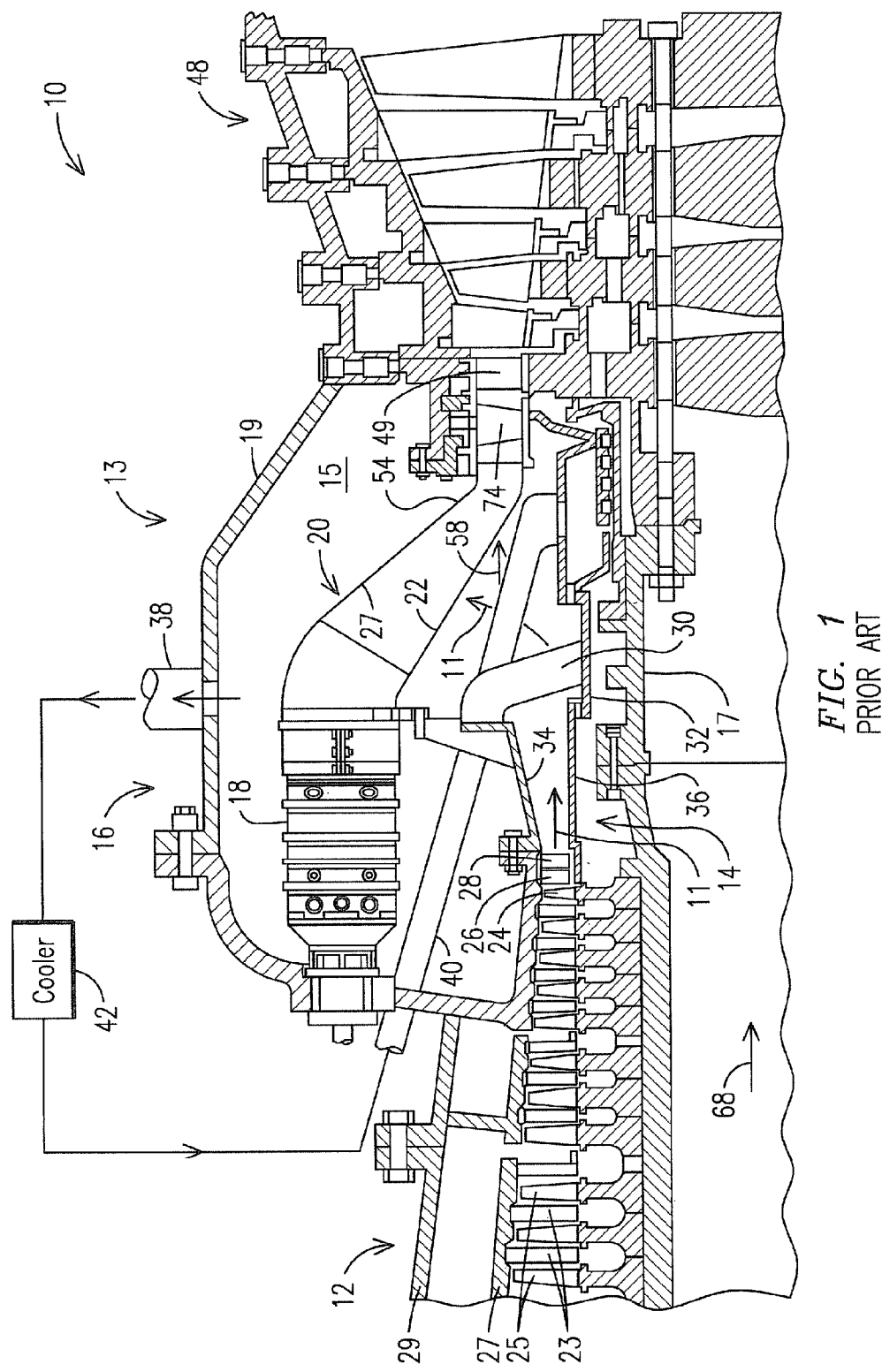
FIG. 1 is a cross-sectional view of a portion of a conventional turbine engine.
Figure 2:
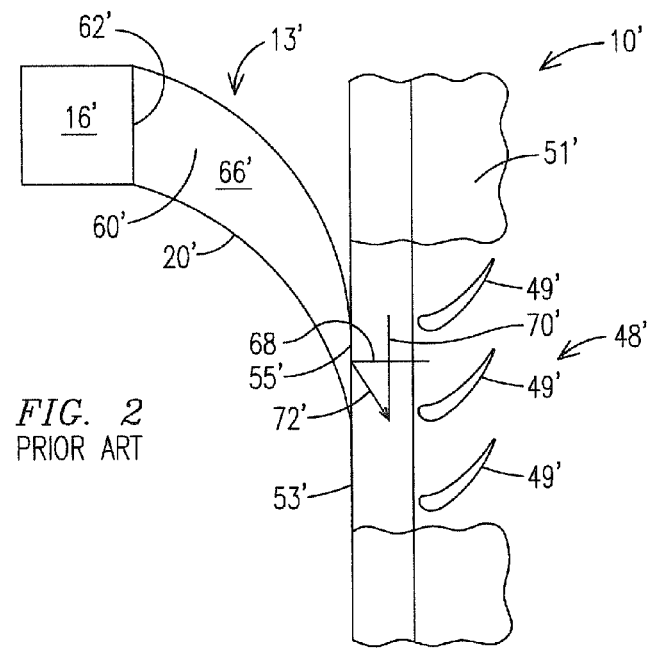
FIG. 2 is a cross-sectional view of a trans-vane design of a transition of a conventional turbine engine.
Figure 3:
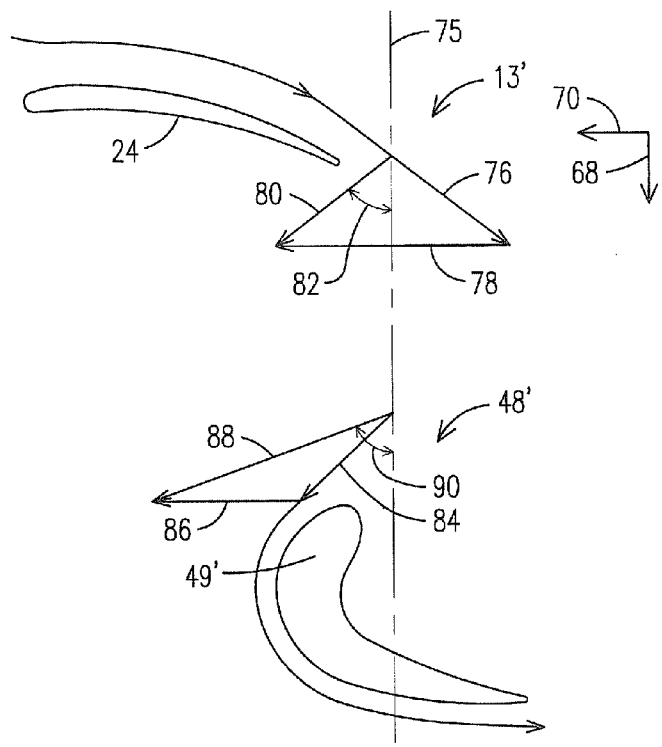
FIG. 3 is a radial view of a last compressor blade and a first turbine blade of the conventional turbine engine of FIG. 2.

As discussed in the above embodiments, a radial air flow may be initiated in the compressor section. Once the radial air flow is initiated, the radial air flow may be delivered to the combustor head-end via any of several flow paths. As previously discussed, the conventional midframe portion 13 of the gas turbine 10 in FIG. 1 features an axial diffuser 14 which discharges the air flow 11 into the chamber 15, after which the air flow 11 experiences aerodynamic loss in the process of randomly entering one of the multiple combustor heads 18. A gas turbine engine having a radial flow output from the compressor/diffuser may similarly discharge into the chamber. Although discharging the air flow into the chamber would introduce pressure and aerodynamic loss as the air flow travels within the chamber to one of the combustor heads, the arrangement would nevertheless involve reduced pressure and aerodynamic losses than the conventional arrangement because the air would undergo less turning. As previously discussed, the air flow 11 discharged from the axial diffuser 14 of the conventional midframe portion 13 undergoes a first 180 degree rotation from an upstream longitudinal direction to a downstream longitudinal direction, to travel to one of the combustor heads 18. In order to reduce the aerodynamic losses associated with discharging the radial flow from the compressor section into the chamber, the radial air flow could be directly coupled from individual portions of the compressor-diffuser outlet to a respective combustor head inlet, thereby bypassing the chamber in which the aerodynamic loss associated with the random entry into one of the multiple combustor heads occurs in the conventional arrangement. Various embodiments of this concept are described in the following paragraphs.

The blades 225 and the last stage blade 224 of the compressor section 212 in FIG. 4 are shifted in an upstream direction 247, to minimize a gap between an outer diameter of the last stage blade 224 and a cylinder 227 that encloses the alternating rows of blades 225 and vanes 223. By minimizing this gap, the power efficiency of the last stage blade 224 is enhanced, to replace more than one stage of the compressor section 212 without a loss of total power. Thus, the last stage blade 224 is provided to reduce the number of vanes 223 and blades 225 in each stage of the compressor section 212, and/or the length of the compressor section 212 in the longitudinal direction 68, thereby enhancing the cost efficiency of manufacturing the midframe portion 213 of the gas turbine engine 210.

Figure 5:
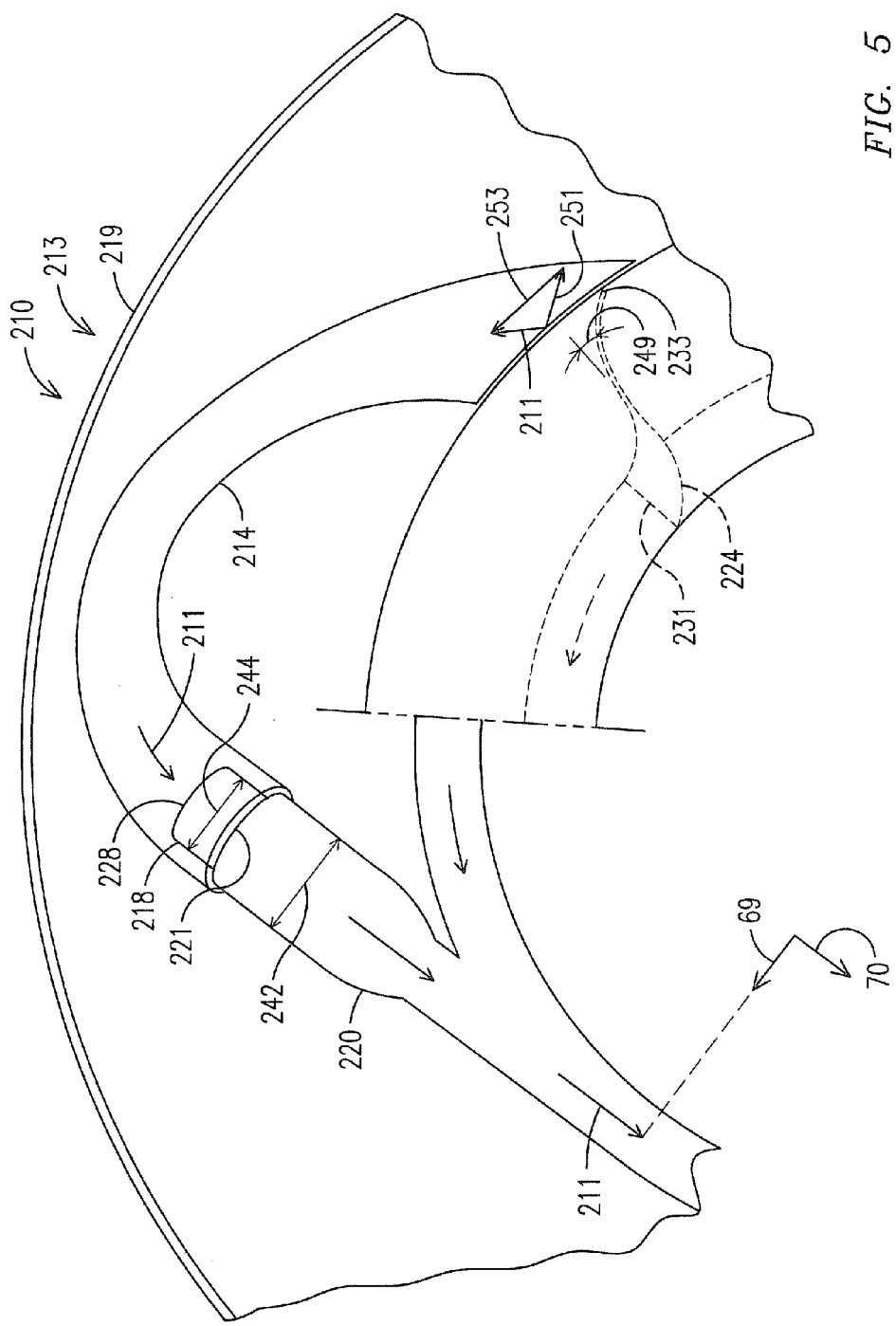
FIG. 5 is a partial upstream longitudinal view of the pipe diffuser illustrated in FIG. 4.
Figure 6:
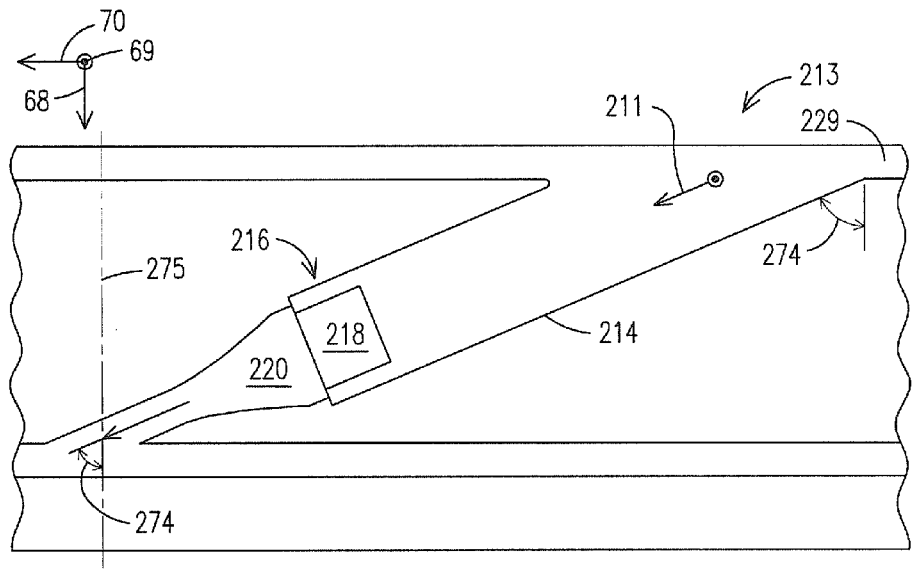
FIG. 6 is a partial radial view of the pipe diffuser illustrated in FIG. 4.

FIGS. 5-6 illustrate a respective cross-sectional view of the midframe portion 213 in the radial-tangential plane (FIG. 5) and in the longitudinal-tangential plane (FIG. 6). FIG. 5 illustrates an upstream longitudinal view of the midframe portion 213, in which the last stage blade 224 is positioned such that the trailing edge 233 is angled at a sweep angle 249 relative to the radial direction. Within the relative reference frame of the last stage blade 224, the air flow 251 is directed off the trailing edge 233 in a direction that is parallel to the trailing edge 233. The last stage blade 224 rotates within the radial-tangential plane of the midframe portion 213 with a rotational speed 253 in the tangential direction. Within the absolute reference frame of the gas turbine engine 210, the air flow 211 is directed in a mixed radial-tangential direction off the trailing edge 233, based on a vector sum of the air flow 251 (within the blade reference frame) and the rotational speed 253 of the blade 224. As illustrated in FIG. 5, the sweep angle 249 of the last stage blade 224 is adjusted, so that the air flow 211 coming off the trailing edge 233 is oriented into an inlet of the diffuser 214, within the radial-tangential plane. Within the radial-tangential plane, the diffuser 214 redirects the air flow 211 from the initial mixed radial-tangential direction at the inlet of the diffuser 214 to the tangential direction 70 at the inlet to the combustor head 218. As illustrated in FIG. 6, within the tangential-longitudinal plane, the sweep angle 249 of the trailing edge 233 (FIG. 5) causes the air flow 211 to initially travel in the radial-tangential plane (i.e., perpendicular to the longitudinal axis 275 in FIG. 6). As illustrated in FIG. 6, within the tangential-longitudinal plane, the diffuser 214 is aligned with an angular offset 274 in the tangential direction 70 relative to the longitudinal direction 68, to introduce a longitudinal turn in the air flow 211 passed into the inlet of the diffuser 214. In an exemplary embodiment of the present invention, the angular offset 274 is 70 degrees, for example. As illustrated in FIG. 6, the diffuser 214 is coupled to the combustor head 218 inlet such that the diffuser 214 is aligned parallel with the transition 220 and is centered with respect to the transition 220, such that the diffuser 214 and the transition 220 are both oriented along the angular offset 274 in the tangential direction 70 with respect to the longitudinal direction 68. As previously discussed, the sweep angle 249 of the trailing edge 233 (FIG. 5) is adjusted, such that the tangential velocity component of the air flow 211 incident into the diffuser 214 is correspondingly adjusted, to orient the air flow 211 into the inlet of the diffuser 214, within the radial-tangential plane. Similarly, within the longitudinal-tangential plane (FIG. 6), the adjustment of the sweep angle 249 of the trailing edge 233 adjusts the tangential velocity component of the air flow 211 incident into the diffuser 214, such that once the diffuser 214 initiates the longitudinal turn in the air flow 211, the air flow 211 is oriented within the diffuser 214 along the angular offset 274 within the longitudinal-tangential plane. The total angle of rotation of the air flow 211 within the midframe portion 213 from the compressor section 212 outlet to the combustor head 218 inlet is less than the total angle of rotation of the air flow 11 in the conventional midframe portion 13 between the compressor section outlet and the combustor head inlet. Additionally, the midframe portion 213 is designed to enhance a manufacturing cost efficiency of the midframe portion 213.

As illustrated in FIGS. 4 and 5, the diffuser 214 receives the mixed radial-tangential flow 211 and redirects the air flow 211 along the angular offset 274 in the tangential direction 70 with respect to the longitudinal direction 68 at the combustion head 218 outlet. The diffuser 214 of the midframe portion 213 receives the mixed radial-tangential flow 211 oriented at the initial radial-tangential direction based on the sweep angle 249, turns the radial flow 211 approximately 20 degrees in the longitudinal direction 68, after which the air flow 211 passes over a longitudinal distance 246 within the diffuser 214 before the diffuser 214 turns the air flow 211 along the angular offset 274 in the tangential direction 70 with respect to the longitudinal direction 68 at the combustion head 218 outlet. As illustrated in FIG. 5, the outer diameter 242 of the diffuser 214 outlet is sized to be greater than the outer diameter 244 of the combustion head 218 inlet, and the face 221 of the diffuser 214 outlet is aligned to be parallel with the face 228 of the combustion head 218 inlet, to align the air flow 211 from the diffuser 214 into the combustion head 218 inlet.

As illustrated in FIG. 4, all of the diffusers 214, the combustor heads 218 and the transitions 220 of the gas turbine engine 210 are enclosed within a single casing 219 that extends around the central axis (not shown), based on the annular configuration of the gas turbine engine 210. The single casing 219 forms a chamber 215 which can collect stagnant, hot air, during an operation of the gas turbine engine 210. To address this stagnant, hot air, an air flow is bled off from an intermediate stage 239 of the compressor section 212 upstream of the last stage blade 224, and is passed into the chamber 215, to circulate the stagnant, hot air within the chamber 215, such as in a vicinity of an inner surface of the casing 219. Additionally, the pressure of the air flow bled off from the intermediate stage 239 may be selected to be an intermediate pressure that is less than a static pressure of the air flow 211 within the combustion head 218 inlet, to establish a flow of air across a seal interface 241 between the diffuser 214 outlet and the combustion head 218 inlet, to disperse any stagnant air from within the seal interface 241 into the chamber 215, such as from a spring seal, for example.

Figure 7:
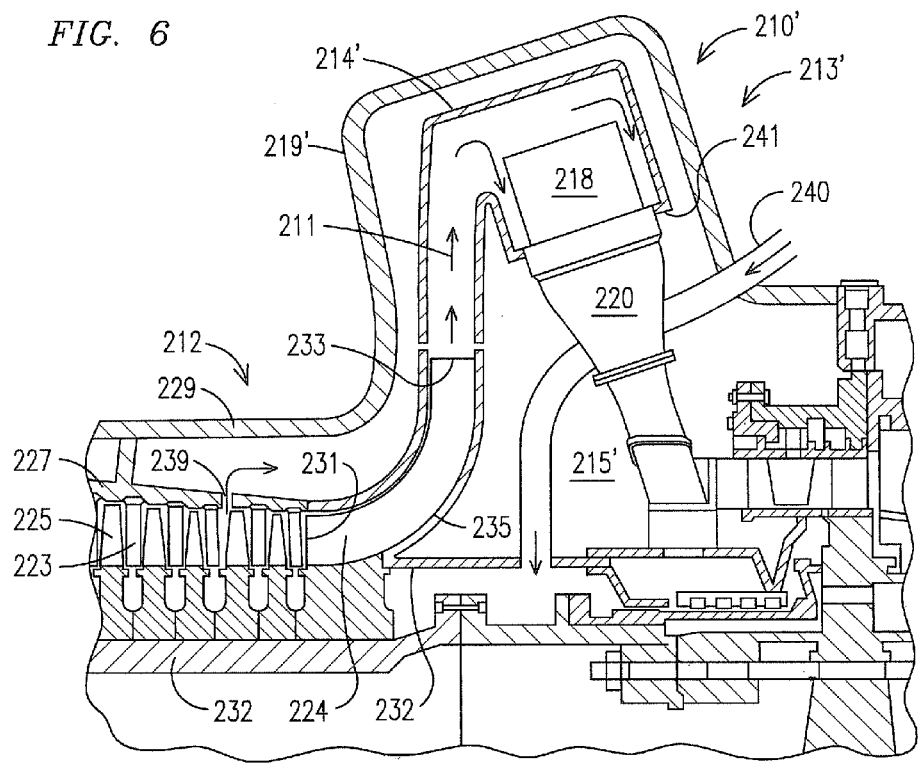
FIG. 7 is a schematic view of a compressor section with a radial outlet to a pipe diffuser within a turbine engine.

FIG. 7 illustrates an alternate embodiment of a midframe portion 213' of a gas turbine engine 210', which is similar to the midframe portion 213 of the gas turbine engine 210 of FIG. 4, with the exception that the diffuser 214' and the casing 219' are designed differently than the diffuser 214 and the casing 219 of the midframe portion 213 of the gas turbine engine 210. As discussed above, the diffuser 214 of the midframe portion 213 of FIG. 4 is designed to rotate the air flow 211 from the initial mixed radial-tangential direction by an angular offset 274 in the longitudinal direction 68, so that the air flow 211 passes along the longitudinal distance 246 within the diffuser 214 before the diffuser 214 directs the air flow 211 along the angular offset 274 (FIG. 6) at the combustion head 218 outlet, to be directed at the first stage blade of the turbine. However, the diffuser 214' of the midframe portion 213' is designed to receive the mixed radial-tangential flow 211 and turn the air flow 211 along the angular offset 274 in the tangential direction 70 at the combustion head 218 outlet, over a reduced longitudinal distance within the diffuser 214', as compared to the air flow 211 within the diffuser 214. Thus, the diffuser 214' is shaped with relatively abrupt outward and inward radial connecting channels. As a result, the diffuser 214' is positioned over a shorter longitudinal distance than the diffuser 214, and thus the midframe portion 213' of the gas turbine engine 210' utilizes less material and/or has a reduced longitudinal length than the midframe portion 213. As previously discussed, the midframe portions 213, 213' of the gas turbine engines 210, 210' replace a plurality of compressor stages with the last stage blade 224, and thus improve the manufacturing cost efficiency, as compared to a conventional midframe design. As discussed above, in addition to the diffuser 214' of the midframe portion 213' of FIG. 7, the casing 219' has a varied design from the casing 219 of the midframe portion 213 of FIG. 4. As discussed above, the casing 219 of the midframe portion 213 encloses all of the diffusers 214, the combustion heads 218 and the transitions 220 which encircle the central axis (not shown) of the gas turbine engine 210, in an annular configuration. In contrast with the single casing 219 of the midframe portion 213, that encloses all of the diffusers 214, the midframe portion 213' includes individual casings 219' which enclose a respective diffuser 214', combustor head 218 and transition 220. In an exemplary embodiment, the casing 219' may be shaped with a rectangular outer surface, to minimize a volume of a chamber 215' within the casing 219', such that hot stagnant air within the chamber 215' is minimized during an operation of the gas turbine engine 210'. As with the midframe portion 213 of FIG. 4, an air flow is bled off from the intermediate stage 239 of the compressor section 212, to pass the air flow into the chamber 215' to circulate any hot, stagnant air within the chamber 215', and to establish a pressure difference across a seal 241 between the diffuser 214' outlet and the combustor head 218 inlet, as in the midframe portion 213. As further illustrated in FIG. 7, rotor cooling injection pipes 240 receive cooled air from an external cooling reservoir (not shown) and pass this cooled air between adjacent transitions 220 of the midframe portion 213' to an inlet in the shaft cover 232, where an air flow is delivered to cool the blades 225 of the compressor section 212. The rotor cooling injection pipe may alternatively receive the cooled air from the chamber 215' and/or the intermediate stage 239 of the compressor section 212, for example.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A midframe portion of a gas turbine engine, comprising:
   a compressor section comprising a last stage blade with a leading edge aligned with a leading edge of blades positioned upstream of the last stage blade, said last stage blade configured to discharge an air flow directed in a radial direction from an outlet of the compressor section;
   a plurality of discrete combustor heads circumferentially arranged around a rotor assembly of the gas turbine engine in an annular configuration; and
   a plurality of manifolds circumferentially arranged around the rotor assembly, wherein each manifold is configured to directly couple a respective portion of the air flow discharged from the compressor section to a respective combustor head;
   wherein the compressor section, the plurality of discrete combustor heads and the plurality of manifolds are positioned within a single casing to form a chamber;
   wherein an air flow is directed from an intermediate stage of the compressor section into the chamber to circulate stagnant air within the chamber.

2. The midframe portion of claim 1, wherein the last stage blade is configured to receive the air flow directed in a longitudinal direction at the leading edge and configured to discharge the air flow in the radial direction at a trailing edge.

3. The midframe portion of claim 2, wherein a sweep angle of the trailing edge is selected to form a desired tangential velocity component of the air flow at the outlet of the compressor section; and wherein the air flow is discharged in a mixed radial-tangential direction from the outlet of the compressor section, said mixed radial-tangential direction based on the sweep angle.

4. The midframe portion of claim 3, wherein the sweep angle is measured in the tangential direction with respect to the radial direction and wherein the sweep angle is greater than zero degrees.

5. The midframe portion of claim 3, wherein the sweep angle of the trailing edge is selected such that the mixed radial-tangential direction of the air flow discharged from the compressor section outlet is aligned with an inlet of a diffuser.

6. The midframe portion of claim 3, wherein each respective manifold is configured to receive a portion of the air flow from the compressor section; wherein the sweep angle of the trailing edge is selected such that the tangential velocity component of the air flow entering the respective manifold is selected, such that the manifold is configured to turn the air flow from the mixed radial-tangential direction to a direction oriented at an offset angle in the tangential direction with respect to the longitudinal direction.

7. The midframe portion of claim 6, wherein the offset angle is 70 degrees.

8. The midframe portion of claim 6, wherein said manifold is configured such that the offset angle in the tangential direction with respect to the longitudinal direction corresponds to a predetermined tangential angle with respect to the longitudinal direction at which a first stage blade of a turbine downstream of the combustor head is configured to receive air flow.

9. The midframe portion of claim 6, further comprising a plurality of transitions positioned downstream of the plurality of combustor heads, wherein the respective manifold and a respective transition are both aligned along the direction oriented at the offset angle in the tangential direction with respect to the longitudinal direction.

10. The midframe portion of claim 3, wherein said manifold is configured to rotate a direction of the air flow from the mixed radial-tangential direction at the inlet of the manifold to a direction oriented at an offset angle in the tangential direction with respect to the longitudinal direction at the inlet to the respective combustor head.

11. The midframe portion of claim 1, wherein an outer diameter of an outlet of each manifold coupled to the respective combustor head inlet is greater than an outer diameter of the combustor head inlet.

12. The midframe portion of claim 11, wherein a face of each manifold outlet is parallel with a face of the respective combustor head inlet, to align the air flow from each manifold into the respective combustor head inlet.

13. The midframe portion of claim 1, wherein the compressor section and manifolds are configured such that the air flow is rotated by a total angle of less than 180 degrees in a longitudinal-radial plane of the gas turbine engine between the compressor section and the respective combustor head.

14. A midframe portion of a gas turbine engine, comprising:
   a compressor section comprising a last stage blade with a leading edge aligned with a leading edge of blades positioned upstream of the last stage blade, said last stage blade configured to discharge an air flow directed in a mixed radial-tangential direction from an outlet of the compressor section; and
   a manifold to directly couple the air flow from the compressor section outlet to an inlet of a respective combustor head of the midframe portion;
   wherein the manifold is oriented at an angular offset in the tangential direction with respect to a longitudinal direction, such that the manifold is configured to initiate a longitudinal turn in the air flow from the mixed radial-tangential direction to a direction oriented at the angular offset in the tangential direction with respect to the longitudinal direction;
   wherein a plurality of manifolds, a plurality of combustor heads and a plurality of transitions positioned downstream of the combustor heads are positioned within a single casing, to form a chamber;
   wherein an air flow is directed from an intermediate stage of the compressor section into the chamber to circulate stagnant air within the chamber.

15. The midframe portion of claim 14, wherein a pressure of air flow from the intermediate stage is an intermediate pressure, said intermediate pressure being less than a static pressure of the air flow in the manifold, to establish a controlled leakage of air flow across an interface between an outlet of the manifold and the combustor head inlet, to disperse stagnant air within the interface.

* * * * *